United States Patent
Takei et al.

(10) Patent No.: US 11,936,490 B2
(45) Date of Patent: Mar. 19, 2024

(54) L2 SWITCH, COMMUNICATION METHOD, AND COMMUNICATION PROGRAM

(71) Applicant: Nippon Telegraph and Telephone Corporation, Tokyo (JP)

(72) Inventors: Yuki Takei, Musashino (JP); Masayuki Nishiki, Musashino (JP); Tomonori Takeda, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 64 days.

(21) Appl. No.: 17/632,942

(22) PCT Filed: Aug. 6, 2019

(86) PCT No.: PCT/JP2019/030889
§ 371 (c)(1),
(2) Date: Feb. 4, 2022

(87) PCT Pub. No.: WO2021/024377
PCT Pub. Date: Feb. 11, 2021

(65) Prior Publication Data
US 2022/0294660 A1 Sep. 15, 2022

(51) Int. Cl.
*H04L 12/28* (2006.01)
*H04L 45/00* (2022.01)
*H04L 45/28* (2022.01)

(52) U.S. Cl.
CPC .......... *H04L 12/2818* (2013.01); *H04L 45/28* (2013.01); *H04L 45/66* (2013.01); *H04L 45/72* (2013.01)

(58) Field of Classification Search
CPC ..... H04L 12/2818; H04L 45/28; H04L 45/66; H04L 45/72; H04L 49/00
(Continued)

(56) References Cited

U.S. PATENT DOCUMENTS 7,941,837 B1 * 5/2011 Jiang ................... H04L 63/0209
713/153
8,943,490 B1 * 1/2015 Jain .......................... G06F 8/65
717/172

(Continued)

FOREIGN PATENT DOCUMENTS

JP 2019-68297 4/2019

*Primary Examiner* — Younes Naji
*Assistant Examiner* — Da T Ton
(74) *Attorney, Agent, or Firm* — Fish & Richardson P.C.

(57) ABSTRACT

Upon receiving a copy of upstream communication from a first switch, a second switch specifies an NF apparatus serving as a transmission source of the upstream communication, based on apparatus information indicating a MAC address of each apparatus and a transmission source MAC address contained in the copy of the upstream communication. The second switch refers to the apparatus information, and MAC address information indicating, for each port of the switch, a MAC address of an apparatus connected via the port, thereby specifying a port of the second switch connected to the NF apparatus, and a MAC address of the transmission source via the port. The second switch stores session information in which information on the specified port and MAC address is associated with header information set for the copy of the upstream communication. Upon receiving downstream communication, the second switch transfers the downstream communication to the NF apparatus.

7 Claims, 13 Drawing Sheets

(58) Field of Classification Search
USPC ......... 709/208–209, 220–224, 227–229, 238
See application file for complete search history.

(56) References Cited

U.S. PATENT DOCUMENTS

| | | | | |
|---|---|---|---|---|
| 2008/0107036 | A1* | 5/2008 | Toyozumi | H04L 43/0829 370/241 |
| 2008/0250496 | A1* | 10/2008 | Namihira | H04L 49/602 726/22 |
| 2009/0116395 | A1* | 5/2009 | Sasaki | H04L 43/50 370/245 |
| 2011/0268435 | A1* | 11/2011 | Mizutani | H04Q 11/0067 398/5 |
| 2013/0064538 | A1* | 3/2013 | Murata | H04Q 11/0067 398/6 |
| 2013/0182720 | A1* | 7/2013 | Matsuike | G06F 9/00 370/476 |
| 2014/0056300 | A1* | 2/2014 | Zhao | H04L 45/42 370/392 |
| 2017/0041161 | A1* | 2/2017 | Kaku | H04L 12/437 |
| 2020/0274736 | A1* | 8/2020 | Kaku | H04L 12/437 |

\* cited by examiner

L2 SWITCH, COMMUNICATION METHOD, AND COMMUNICATION PROGRAM

CROSS-REFERENCE TO RELATED APPLICATIONS

This application is a National Stage application under 35 U.S.C. § 371 of International Application No. PCT/JP2019/030889, having an International Filing Date of Aug. 6, 2019. The disclosure of the prior application is considered part of the disclosure of this application, and is incorporated in its entirety into this application.

TECHNICAL FIELD

The present invention relates to an L2 switch, a communication control method, and a communication control program.

BACKGROUND ART

There are techniques for providing functions such as a load balancer and a firewall through a plurality of network functions (NFs) in communication via a network, for example, communication between terminals and servers. In such techniques, for example, in the case in which high capacity traffic is transferred on a network, the scale out method is used in which processing is distributed to a plurality of NFs. In this case, if NFs provide the above-mentioned functions such as a firewall, it may be necessary that upstream communication and downstream communication of that communication are transmitted via the same NF.

In this case, in order to transmit upstream communication and downstream communication of that communication via the same NF, a following technique is proposed. An L2 (layer 2) switch is arranged on the path after an NF, and the L2 switch stores session information of received upstream communication. Then, when the L2 switch receives downstream communication of the upstream communication, the downstream communication is transferred to the same NF as that via which the upstream communication was transmitted, based on the session information of the upstream communication (see PTL 1).

CITATION LIST

Patent Literature

[PTL 1] Japanese Patent Application Publication No. 2019-068297

SUMMARY OF THE INVENTION

Technical Problem

In case a failure occurs in the above-described L2 switch, the L2 switch may have a redundant configuration. In this case, if a failure occurs in a master L2 switch among the L2 switches with a redundant configuration, downstream communication that is originally to be transferred to the master L2 switch is transferred to a slave L2 switch. However, the slave L2 switch does not have session information regarding upstream communication received by the master L2 switch. Accordingly, slave L2 switch cannot transfer the downstream communication to the same NF as that via which the upstream communication was transmitted. As a result, there are problems that a session of the downstream communication is interrupted or a packet drop occurs.

An object of the present invention is to address the above-described problems and reduce interruption of sessions and occurrence of packet drops even in the case in which a failure occurs in a master L2 switch among L2 switches connected to NFs.

Means for Solving the Problem

In order to address the above-described problems, the present invention is directed to an L2 switch including: a receiving unit configured to receive a copy of upstream communication transmitted from a network apparatus, from another L2 (layer 2) switch that relays the upstream communication; an apparatus specifying unit configured to specify a network apparatus serving as a transmission source of the upstream communication, based on apparatus information indicating one or more MAC addresses respectively set for network apparatuses, and a transmission source MAC address contained in the received copy of the upstream communication; a session information processing unit configured to refer to the apparatus information, and MAC address information indicating, for each port of the L2 switch, a MAC address of an apparatus connected via the port, thereby specifying a port of the L2 switch connected to the specified network apparatus serving as the transmission source of the upstream communication, and a MAC address of the transmission source of the upstream communication connected via the port, and to store session information of the upstream communication in which information on the specified port and MAC address is associated with header information set for the received copy of the upstream communication, in a storage unit; and a transferring unit configured to, upon receiving downstream communication corresponding to the upstream communication, transfer the downstream communication to the network apparatus serving as the transmission source of the upstream communication, using the port and the MAC address indicated by the session information of the upstream communication stored in the storage unit.

Effects of the Invention

According to the present invention, it is possible to reduce interruption of sessions and occurrence of packet drops even in the case in which a failure occurs in a master L2 switch among L2 switches connected to NFs.

DESCRIPTION OF EMBODIMENTS

Hereinafter, modes to carry out the present invention (embodiments) will be described with reference to the drawings. First, a basic operation of an L2 (layer 2) switch 10 according to embodiments will be described with reference to FIGS. 1 and 2. The present invention is not limited to the embodiments described below.

Figure 1:
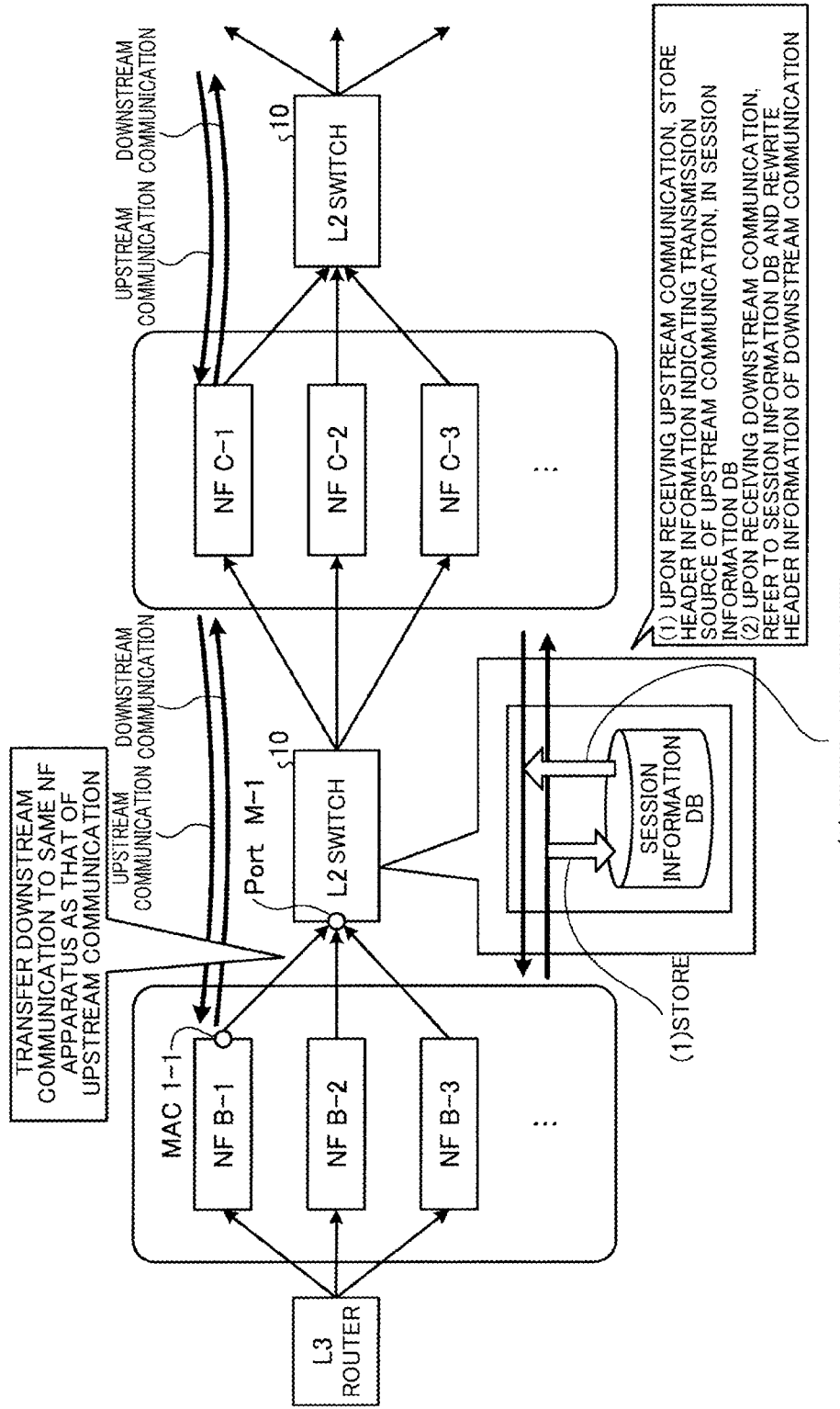
FIG. 1 is a diagram illustrating a basic operation of an L2 switch according to embodiments.

As shown in FIG. 1, for example, the L2 switch 10 is connected to a plurality of NF apparatuses (NF B-1 to NF B-3 and NF C-1 to NF C-3), and transfers communication received from an NF apparatus (network apparatus), to a next NF apparatus. If NF apparatuses are, for example, apparatuses that provide functions such as a load balancer and a firewall, it is necessary that upstream communication and downstream communication of that communication are transmitted via the same NF apparatus.

Thus, upon receiving downstream communication corresponding to upstream communication, the L2 switch 10 performs the following processing in order to transfer the downstream communication to the same NF apparatus as that of the upstream communication. That is to say, upon receiving upstream communication, the L2 switch 10 stores header information (e.g., a MAC address of an NF B-1) indicating a transmission source of the upstream communication, in a session information DB (database) (see FIG. 3) ((1)). Subsequently, upon receiving downstream communication, the L2 switch 10 refers to the session information DB (see FIG. 3), and rewrites header information of the downstream communication ((2)).

For example, the L2 switch 10 rewrites the destination MAC address in the header information of the downstream communication to the MAC address of the NF B-1. Accordingly, the downstream communication output from the L2 switch 10 reaches the same NF apparatus (the NF B-1) as that of the upstream communication.

In the communication system according to embodiments, the L2 switch 10 has a redundant configuration in case a failure occurs in the L2 switch 10. That is to say, the communication system includes, in addition to a master L2 switch 10, a slave L2 switch 10 for use when a failure occurs in the master L2 switch 10. In the following description, the master L2 switch 10 is referred to as an L2 switch 10A, and the slave L2 switch 10 is referred to as an L2 switch 10B.

Figure 2:
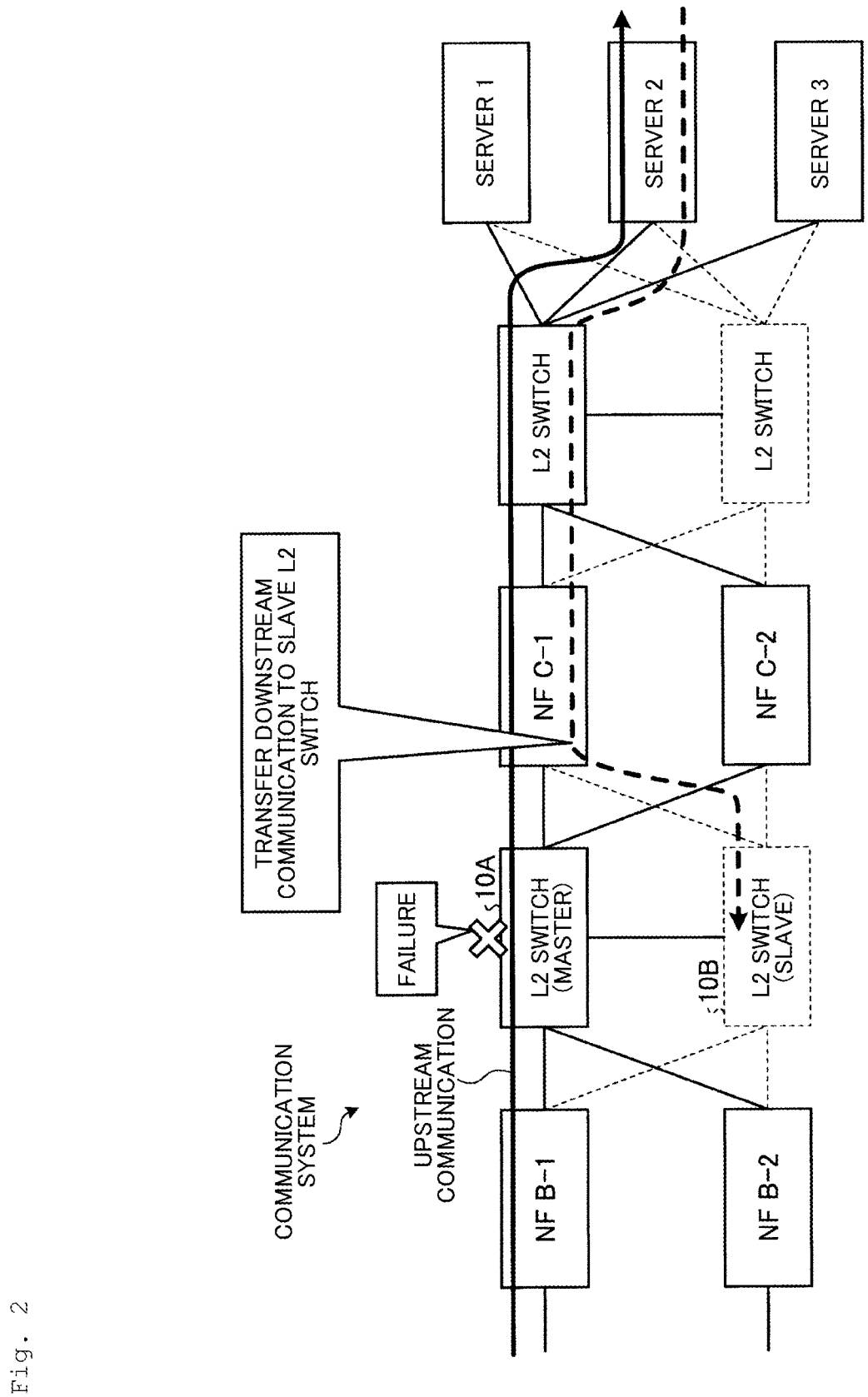
FIG. 2 is a diagram illustrating an operation when a failure occurs in a master L2 switch.

For example, if a failure occurs in the L2 switch 10A after it transfers upstream communication shown in FIG. 2, downstream communication corresponding to the upstream communication is transferred to the slave L2 switch 10B.

Note that the L2 switches 10 (10A and 10B) may be arranged between NF apparatuses or between an NF apparatus and an apparatus (e.g., a server) that is not an NF apparatus.

First Embodiment

Summary

First, a schematic operation of a communication system according to the first embodiment will be described with reference to FIG. 3.

For example, upon receiving upstream communication IP A→IP D from the NF B-1, the L2 switch 10A in the communication system according to the first embodiment stores IP A, IP D, . . . of the upstream communication, in a Hash Index (5tuple) in a session information DB 14A, and stores a transmission source MAC address (MAC 1-1) and an input port (Port M-1) of the upstream communication, as retained information regarding the upstream communication ((1)): store 5tuple, an input MAC address, and an input port).

Furthermore, the L2 switch 10A copies a packet of the upstream communication, and transfers it to the slave L2 switch 10B ((2)).

Upon receiving the copy of the packet of the upstream communication, the L2 switch 10B stores session information in a session information DB 14B, based on the received packet.

For example, if the copied packet is input from a Port s-4 of the L2 switch 10B, the L2 switch 10B stores session information (see the reference numeral 301) in which the source MAC address (MAC 1-1) and the input port (Port s-4) of the copied packet are associated with the 5tuple (IP A, IP D, etc.) of the copied packet, in the session information DB 14B.

Subsequently, the L2 switch 10B specifies an NF apparatus via which the upstream communication was transmitted, based on the source MAC address of the input packet (the above-mentioned copied packet) ((3-1)).

For example, the L2 switch 10B refers to the source MAC address of the input packet and an apparatus information DB (information indicating, for each apparatus, a MAC address used by the apparatus), thereby specifying that the NF apparatus via which the upstream communication was transmitted is the NF B-1.

Next, the L2 switch 10B compares a MAC address in the same NF apparatus as that specified in (3-1) and a MAC address registered in a MAC learning DB 15B, thereby specifying a MAC address connected to the slave L2 switch 10B ((3-2)). Note that the MAC learning DB 15B stores information indicating, for each port used by the L2 switch 10B, a MAC address of an apparatus connected via the port.

Figure 3:
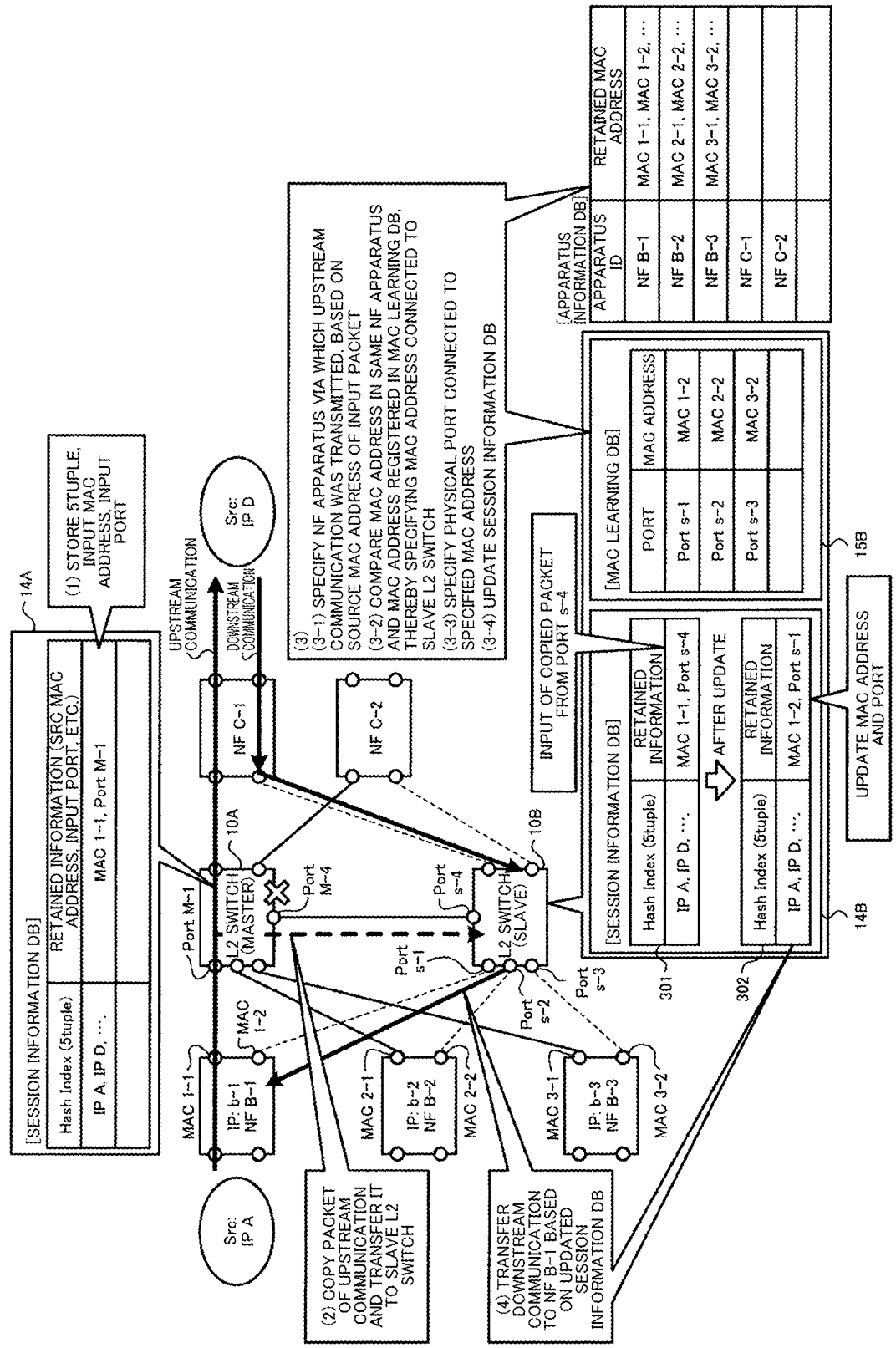
FIG. 3 is a diagram illustrating a schematic operation of a communication system according to a first embodiment.

For example, the L2 switch 10B refers to the apparatus information DB and the MAC learning DB 15B shown in FIG. 3, thereby specifying a MAC address (e.g., a MAC 1-2) connected to the L2 switch 10B among the MAC addresses in the NF B-1.

Next, the L2 switch 10B refers to the MAC learning DB 15B, thereby specifying a port connected to the MAC address specified in (3-2) ((3-3)).

For example, the L2 switch 10B refers to the MAC learning DB 15B, thereby specifying a Port s-1 connected to the MAC 1-2 of the NF B-1.

Then, the L2 switch 10B updates the session information DB 14B, using information on the MAC address specified in (3-2) and information on the port specified in (3-3) ((3-4)).

For example, the L2 switch 10B updates the MAC address and the port in the information indicated by the reference numeral 301, as indicated by the reference numeral 302. That is to say, the L2 switch 10B updates the retained information in the session information of the Hash Index (5tuple) (IP A, IP D, . . . ) of the downstream communication, stored in the session information DB 14B, to MAC 1-2, Port s-1.

Subsequently, in the case of receiving downstream communication from an NF C-1 due to a failure that has occurred in the L2 switch 10A, the L2 switch 10B transfers the downstream communication to the NF B-1, based on the updated session information DB 14B ((4)). That is to say, the L2 switch 10B changes the destination MAC address of the downstream communication to MAC 1-2, based on the updated session information (see the reference numeral 302), and performs transmission from the Port s-1. Accordingly, the downstream communication reaches the NF B-1 via which the upstream communication was transmitted.

Configuration

Figure 4:
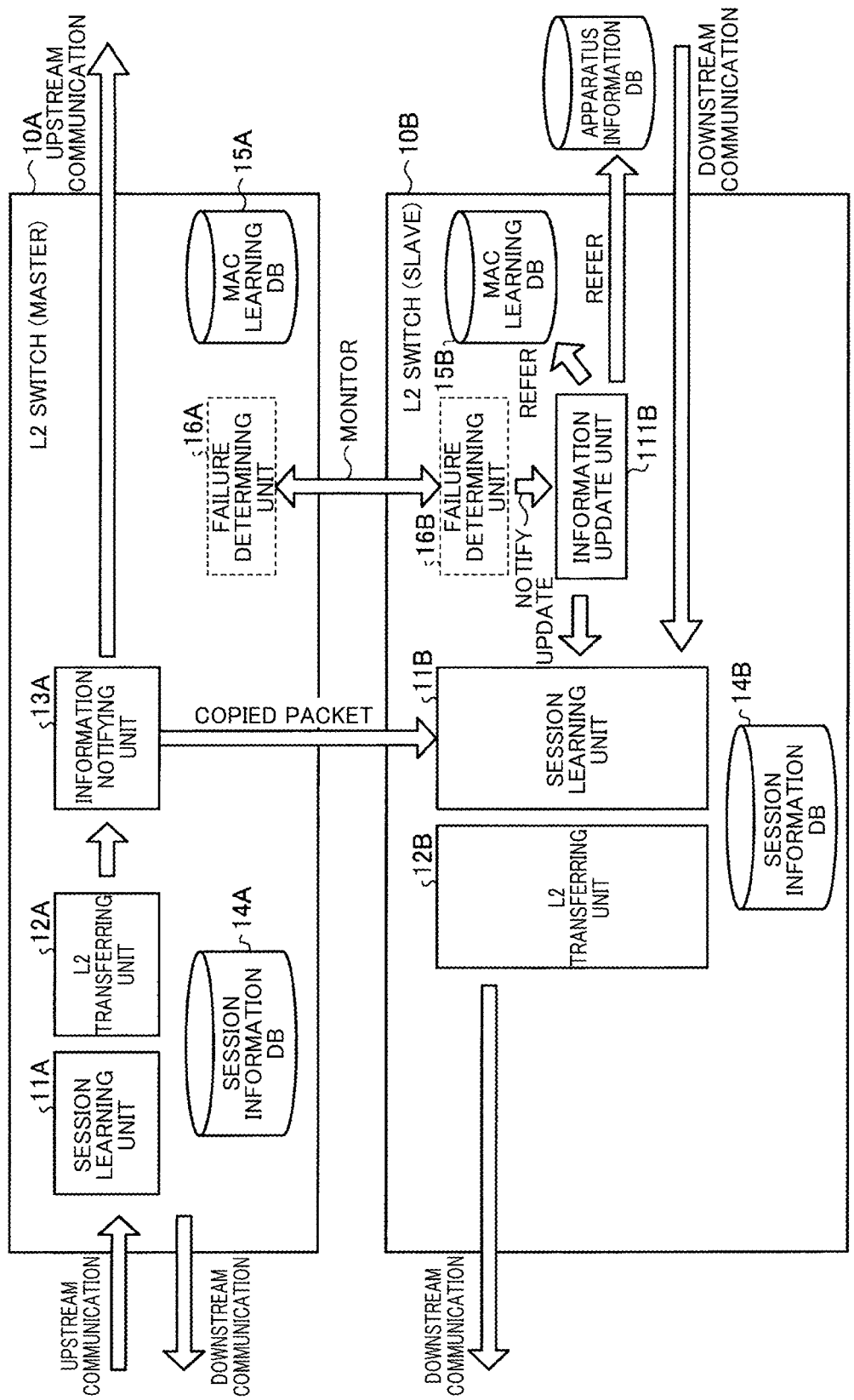
FIG. 4 is a diagram showing a configuration example of a master L2 switch and a slave L2 switch according to embodiments.

Next, a configuration example of the L2 switch 10A and the L2 switch 10B in the communication system according to the first embodiment will be described with reference to FIG. 4. Note that, although FIG. 4 shows that the apparatus information DB is arranged outside the L2 switches 10A and 10B, it may be arranged inside the L2 switches 10A and 10B.

First, a configuration example of the L2 switch 10A will be described. The L2 switch 10A includes a session learning unit (a session information generating unit) 11A, an L2 transferring unit 12A, an information notifying unit 13A, a session information DB 14A, and a MAC learning DB (a MAC address information) 15A. Note that a failure determining unit 16A indicated by the broken line may or may not be included, and the case in which it is included will be described in the second embodiment.

Based on the header information of communication (e.g., upstream communication) received from another apparatus, the session learning unit 11A generates session information of the communication (e.g., information indicating 5tuple, a transmission source MAC address, and an input port of the communication). Then, the session learning unit 11A stores the generated session information in the session information DB 14A.

The L2 transferring unit 12A transfers the communication received from another apparatus. Furthermore, upon receiving downstream communication, the L2 transferring unit 12A transfers the downstream communication based on the session information of the communication indicated by the session information DB 14A.

For example, upon receiving downstream communication, the L2 transferring unit 12A searches the session information DB 14A for session information of the communication, based on 5tuple of the downstream communication. Then, the L2 transferring unit 12A changes the destination MAC address of the downstream communication to a MAC address indicated by the session information of the communication. Then, the L2 transferring unit 12A transmits the downstream communication whose destination MAC address has been changed, from a port indicated by the session information of the communication.

The information notifying unit 13A copies a packet of the communication (e.g., upstream communication) that is transferred by the L2 transferring unit 12A, and transfers the packet that was copied (copied packet) to the L2 switch 10B.

The session information DB 14A stores information in which the transmission source MAC address and the input port of the communication are associated with the 5tuple of the communication received by the L2 switch 10A (see FIG. 3).

The MAC learning DB 15A stores information indicating, for each port of the L2 switch 10A, a MAC address of an apparatus connected via the port (see FIG. 3).

Note that the session information DB 14A and the MAC learning DB 15A described above are included in a predetermined area of a storage unit (not shown) of the L2 switch 10A.

The L2 switch 10B includes a session learning unit (a session information generating unit) 11B, an information update unit (an apparatus specifying unit and a session information processing unit) 111B, an L2 transferring unit 12B, an information notifying unit 13B, a session information DB 14B, and a MAC learning DB (a MAC address information) 15B. Note that a failure determining unit 16B indicated by the broken line may or may not be included, and the case in which it is included will be described in the second embodiment.

Based on the header information of communication received from another apparatus, the session learning unit 11B generates session information of the communication. Then, the session learning unit 11B stores the generated session information in the session information DB 14B.

For example, upon receiving a copied packet of the upstream communication from the L2 switch 10A, the session learning unit 11B generates session information of the communication of the copied packet (e.g., information indicating 5tuple, a transmission source MAC address, and an input port of the communication), based on the header information of the copied packet. Then, the session learning unit 11B stores the generated session information in the session information DB 14B.

The information update unit 111B updates the session information stored in the session information DB 14B.

For example, the information update unit 111B first refers to the transmission source MAC address of the copied packet of the upstream communication received by the information notifying unit 13B and the apparatus information DB, thereby specifying an NF apparatus via which the upstream communication was transmitted.

Next, the information update unit 111B refers to the apparatus information DB and the MAC learning DB 15B, thereby specifying a MAC address connected to the L2 switch 10B (e.g., MAC 1-2 of the NF B-1 shown in FIG. 3) among MAC addresses of the specified NF apparatus.

Then, the information update unit 111B refers to the MAC learning DB 15B, thereby specifying a port connected to the specified MAC address. Subsequently, the information update unit 111B updates the session information of the communication stored in the session information DB 14B, using information on the specified MAC address and port.

The L2 transferring unit 12B transfers the communication received from another apparatus. Furthermore, upon receiving downstream communication, the L2 transferring unit 12B transfers the downstream communication based on the session information of the communication shown in the session information DB 14B.

For example, upon receiving downstream communication, the L2 transferring unit 12B searches the session information DB 14B for session information of the communication, based on 5tuple of the downstream communication. Then, the L2 transferring unit 12B changes the destination MAC address of the downstream communication to a MAC address indicated by the session information of the communication. Then, the L2 transferring unit 12B transmits the downstream communication whose destination MAC address has been changed, from a port indicated by the session information of the communication.

Note that, if the session information of the session information DB 14B is updated by the information update unit 111B, the L2 transferring unit 12B performs the above-described transfer processing based on the updated session information. Accordingly, upon receiving downstream communication, the L2 transferring unit 12B can transfer the downstream communication to the NF apparatus via which the upstream communication was transmitted.

The information notifying unit 13B receives the copied packet transmitted from the L2 switch 10A.

The session information DB 14B stores session information of the communication received by the L2 switch 10B (see FIG. 3).

The MAC learning DB 15B stores information indicating, for each port of the L2 switch 10B, a MAC address of an apparatus connected via the port (see FIG. 3).

Note that the session information DB 14B and the MAC learning DB 15B described above are included in a predetermined area of a storage unit (not shown) of the L2 switch 10B.

Processing Procedure

Figure 5:
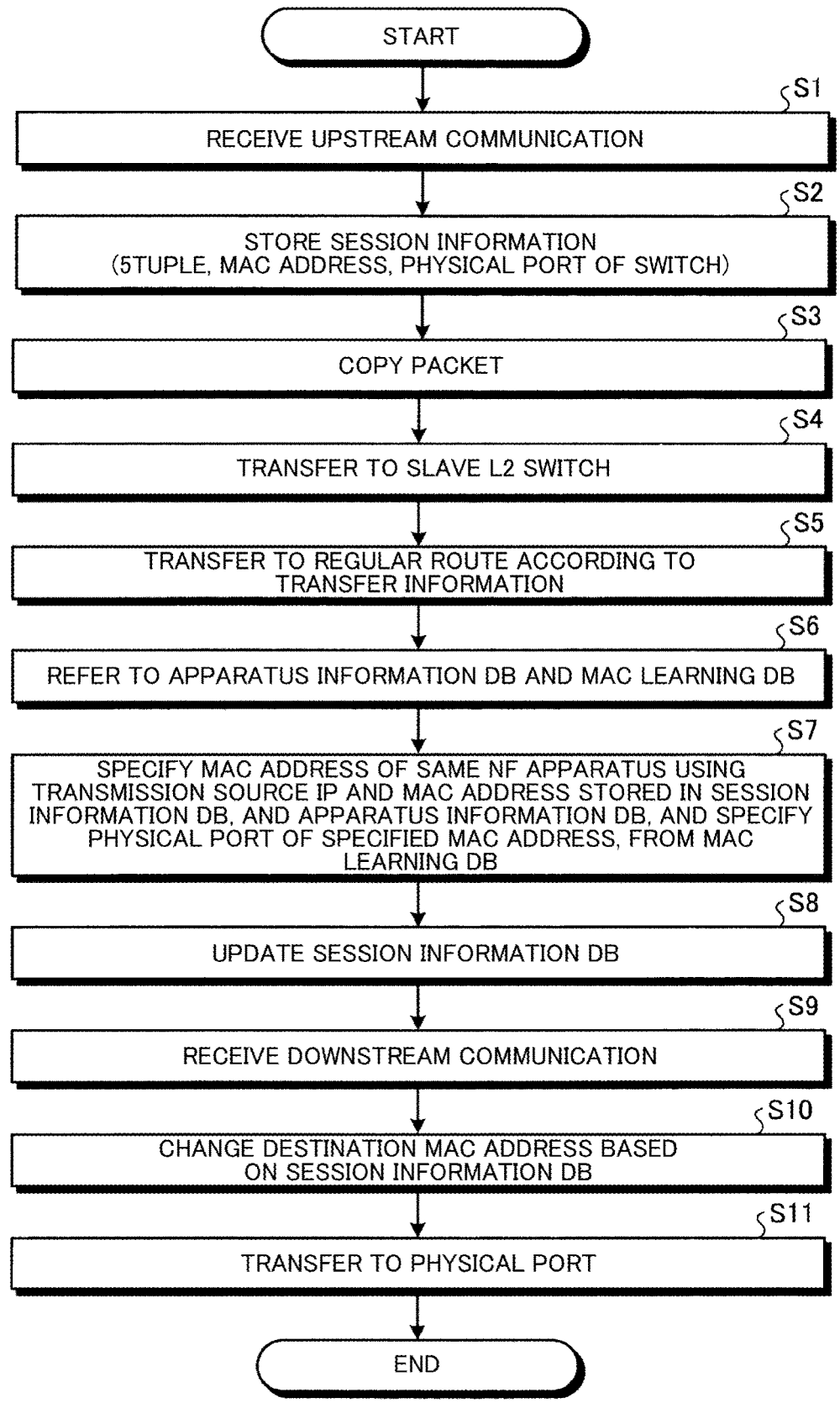
FIG. 5 is a flowchart showing an example of the processing procedure of a communication system according to the first embodiment.

Next, an example of the processing procedure of the communication system will be described with reference to FIG. 5. For example, if the L2 transferring unit 12A of the L2 switch 10A of the communication system receives upstream communication (S1), the session learning unit 11A stores session information of the communication (the 5tuple, the MAC address, and the physical port of the switch) in the session information DB 14A (S2).

Next, the information notifying unit 13A of the L2 switch 10A copies a packet of the received upstream communication (S3), and transfers it to the slave L2 switch 10B (S4). Furthermore, the L2 transferring unit 12A transfers the upstream communication received in S1, to a regular route, according to the transfer information (S5).

Note that the copied packet transmitted in S4 is received by the information notifying unit 13B of the L2 switch 10B. Then, the session learning unit 11B of the L2 switch 10B stores session information of the received copied packet (the 5tuple, the MAC address, and the physical port of the switch) in the session information DB 14B.

After S5, the information update unit 111B of the L2 switch 10B updates the session information stored in the session information DB 14B based on the apparatus information DB and the MAC learning DB 15B.

For example, the information update unit 111B refers to the apparatus information DB and the MAC learning DB 15B (S6), thereby specifying a MAC address of the same NF apparatus using the transmission source IP and the MAC address stored in the session information DB 14B, and the apparatus information DB, and further specifying a physical port of the specified MAC address, from the MAC learning DB 15B (S7).

For example, the information update unit 111B specifies an NF apparatus serving as a transmission source of the copied packet and MAC addresses set for the NF apparatus, from session information regarding the communication of the copied packet stored in the session information DB 14B. Then, the information update unit 111B specifies a MAC address connected to the L2 switch 10B, among the specified MAC addresses, and a physical port to the MAC address.

After S7, the information update unit 111B updates the session information DB 14B, using the MAC address and the physical port specified in S7 (S8).

After S8, upon receiving downstream communication (S9), the L2 transferring unit 12B of the L2 switch 10B changes the destination MAC address of the downstream communication, based on the session information DB 14B updated in S8 (S10), and transfers the downstream communication from the physical port (S11).

With this communication system, even in the case in which a failure occurs in the L2 switch 10A that transferred upstream communication, the L2 switch 10B can transfer downstream communication to the NF apparatus via which the upstream communication was transmitted.

Second Embodiment

Next, a communication system according to the second embodiment will be described. In the second communication system, the L2 switch 10B monitors whether or not a failure has occurred in the L2 switch 10A, and, if it is determined that a failure has occurred in the L2 switch 10A, the session information DB 14B is updated.

Summary

Hereinafter, a schematic operation of the communication system according to the second embodiment will be described with reference to FIG. 6. The communication system according to the second embodiment stores session information (the same session information as that indicated by the reference numeral 301 in FIG. 3) in which retained information "MAC 1-1, Port s-4" is associated with Hash Index (5tuple) "IP A, IP D, . . . ", in the session information DB 14B of the L2 switch 10B, through the same procedure as that of (1) and (2) described with reference to FIG. 3.

Subsequently, upon receiving downstream communication, the L2 switch 10B sees whether or not a failure has occurred in the L2 switch 10A. Then, if it is determined that a failure has occurred in the L2 switch 10A (in the case of a failure), the L2 switch 10B updates the session information in a similar way to that of the first embodiment. That is to say, the L2 switch 10B refers to the apparatus information DB and the MAC learning DB 15B, and updates the retained information in the session information Hash Index (5tuple) "IP A, IP D, . . . " to "MAC 1-2, Port s-1".

Figure 6:
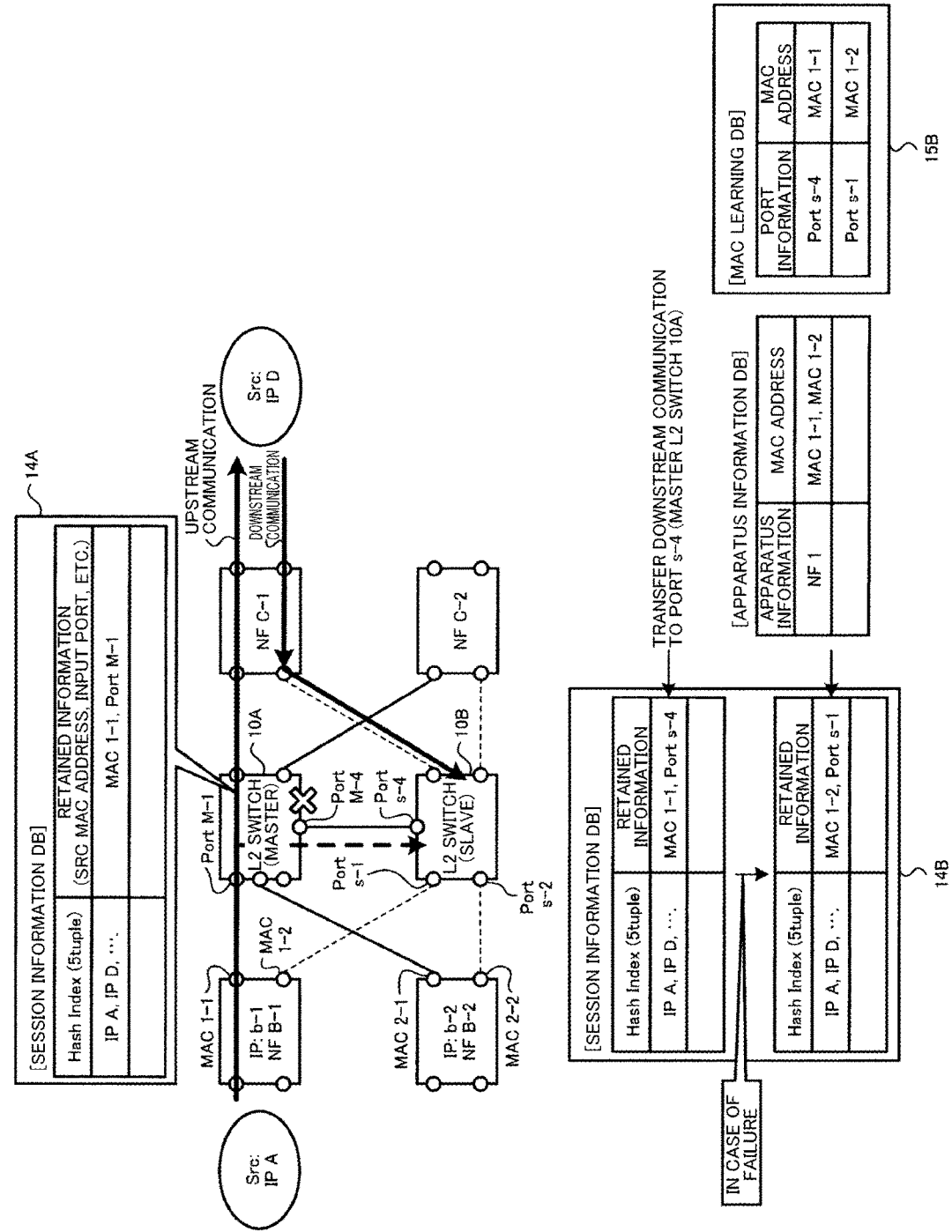
FIG. 6 is a diagram illustrating a schematic operation of a communication system according to a second embodiment.

Note that, although not shown in FIG. 6, if the L2 switch 10B receives downstream communication and it is determined that no failure has occurred in the L2 switch 10A, the downstream communication is transferred from the Port s-4 to the L2 switch 10A based on the session information before update. Then, the L2 switch 10A further transfers the transferred downstream communication, to the NF B-1 based on the session information of the upstream communication in the session information DB 14A.

Configuration

Next, returning to FIG. 1, a configuration example of the L2 switch 10A and the L2 switch 10B in the communication system according to the second embodiment will be described. The same constituent elements as those in the first embodiment are denoted by the same reference numerals and a description thereof has been omitted. First, a configuration example of the L2 switch 10A will be described.

The L2 switch 10A includes a failure determining unit 16A. Furthermore, the L2 switch 10B includes a failure determining unit 16B. Each of the failure determining units 16A and 16B determines whether or not a failure has occurred in the corresponding L2 switch 10, for example, by transmitting a packet to the corresponding L2 switch 10.

For example, the failure determining unit 16B of the L2 switch 10B monitors whether or not a failure has occurred in the L2 switch 10A, by transmitting a monitoring packet (e.g., ping, etc.) at predetermined intervals to the failure determining unit 16A of the L2 switch 10A and checking the response therefrom. Then, upon detecting that a failure that has occurred in the L2 switch 10A, the failure determining unit 16B notifies the information update unit 111B of that effect.

Upon receiving the notification from the failure determining unit 16B to the effect that a failure has occurred in the L2 switch 10A, the information update unit 111B updates the session information DB 14B in a similar way to that of the first embodiment.

That is to say, the information update unit 111B refers to the transmission source MAC address of the copied packet received by the information notifying unit 13B and the apparatus information DB, thereby specifying an NF apparatus via which the upstream communication was transmitted.

Next, the information update unit 111B refers to the apparatus information DB and the MAC learning DB 15B, thereby specifying a MAC address connected to the L2 switch 10B (e.g., MAC 1-2 of the NF B-1 shown in FIG. 6) among MAC addresses of the specified NF apparatus.

Next, the information update unit 111B refers to the MAC learning DB 15B, thereby specifying a port connected to the specified MAC address. Subsequently, the information update unit 111B updates the session information of the communication stored in the session information DB 14B, using information on the specified MAC address and port.

Processing Procedure

Next, an example of the processing procedure of the second communication system will be described with reference to FIG. 7. Note that S1 to S5 in FIG. 7 are similar to S1 to S5 in FIG. 5, and thus a description thereof has been omitted and only S21 and its following steps in FIG. 7 will be described.

Figure 7:
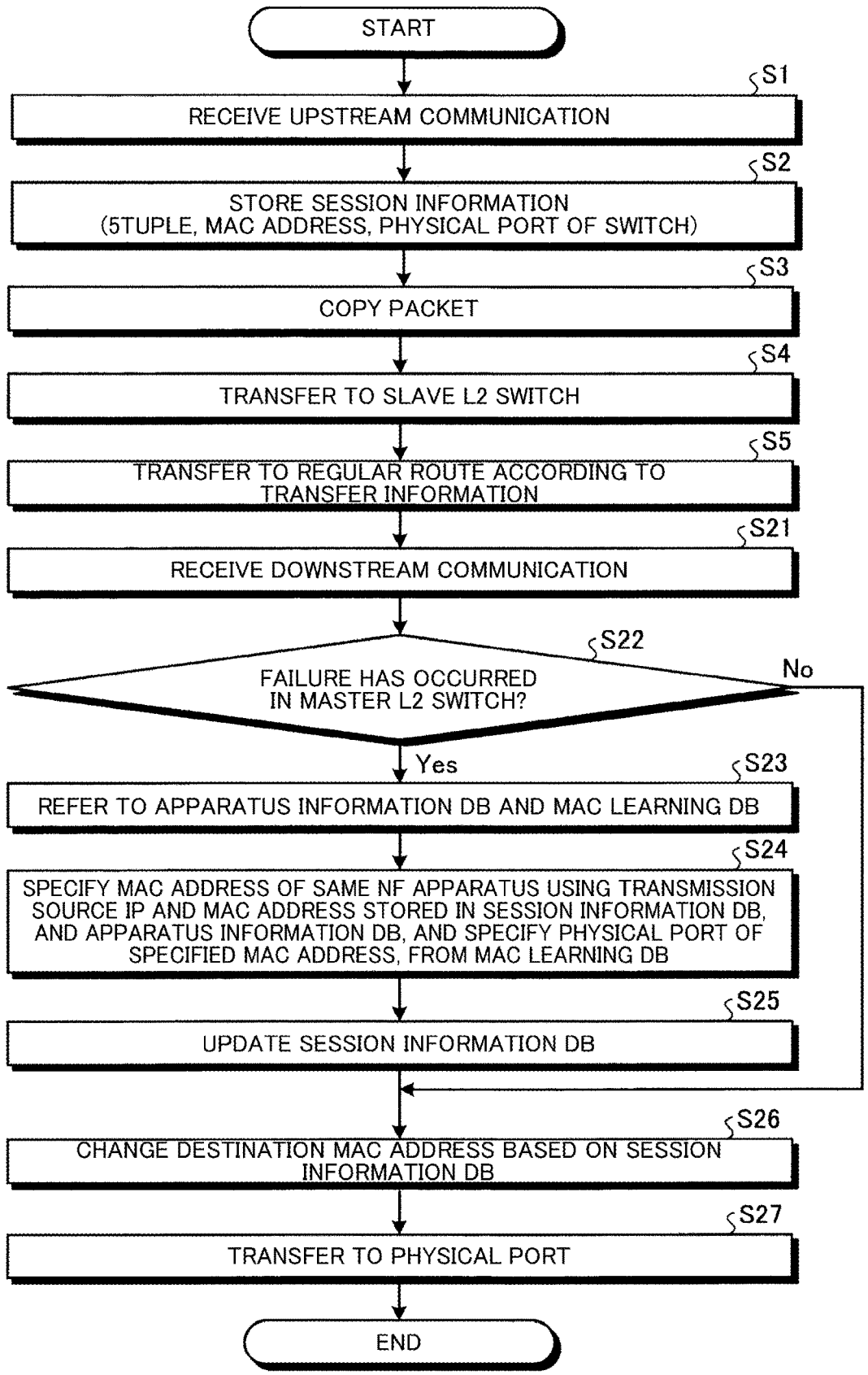
FIG. 7 is a flowchart showing an example of the processing procedure of the communication system according to the second embodiment.

After S5 in FIG. 7, if the L2 transferring unit 12B of the L2 switch 10B receives downstream communication (S21), the failure determining unit 16B determines whether or not a failure has occurred in the master L2 switch 10A (S22).

If the failure determining unit 16B determines that a failure occurs in the master L2 switch 10A (Yes in S22), the failure determining unit 16B notifies the information update unit 111B of the effect that a failure has occurred in the L2 switch 10A. Then, the information update unit 111B performs the processing in S23 to S25. The processing in S23 to S25 is similar to that in S6 to S8 in FIG. 5, and the processing in S26 and S27 in FIG. 7 is similar to that in S10 and S11 in FIG. 5, and thus a description thereof has been omitted.

On the other hand, if the failure determining unit 16B determines in S22 that no failure has occurred in the master L2 switch 10A (No in S22), the procedure skips the processing in S23 to S25, and advances to S26. That is to say, if no failure has occurred in the L2 switch 10A, the L2 transferring unit 12B of the L2 switch 10B returns the downstream communication to the L2 switch 10A, based on the session information generated based on the copied packet from the L2 switch 10A. Then, upon receiving the downstream communication, the L2 transferring unit 12A of the L2 switch 10A transfers the downstream communication to the NF apparatus via which the upstream communication was transmitted, based on the session information DB 14A.

With this communication system as well, the L2 switch 10B can transfer the downstream communication to the NF apparatus via which the upstream communication was transmitted.

Other Embodiments

It is also possible that the L2 switch 10B transfers downstream communication to the L2 switch 10A, using methods 1 and 2, which will be described below.

Figure 8:
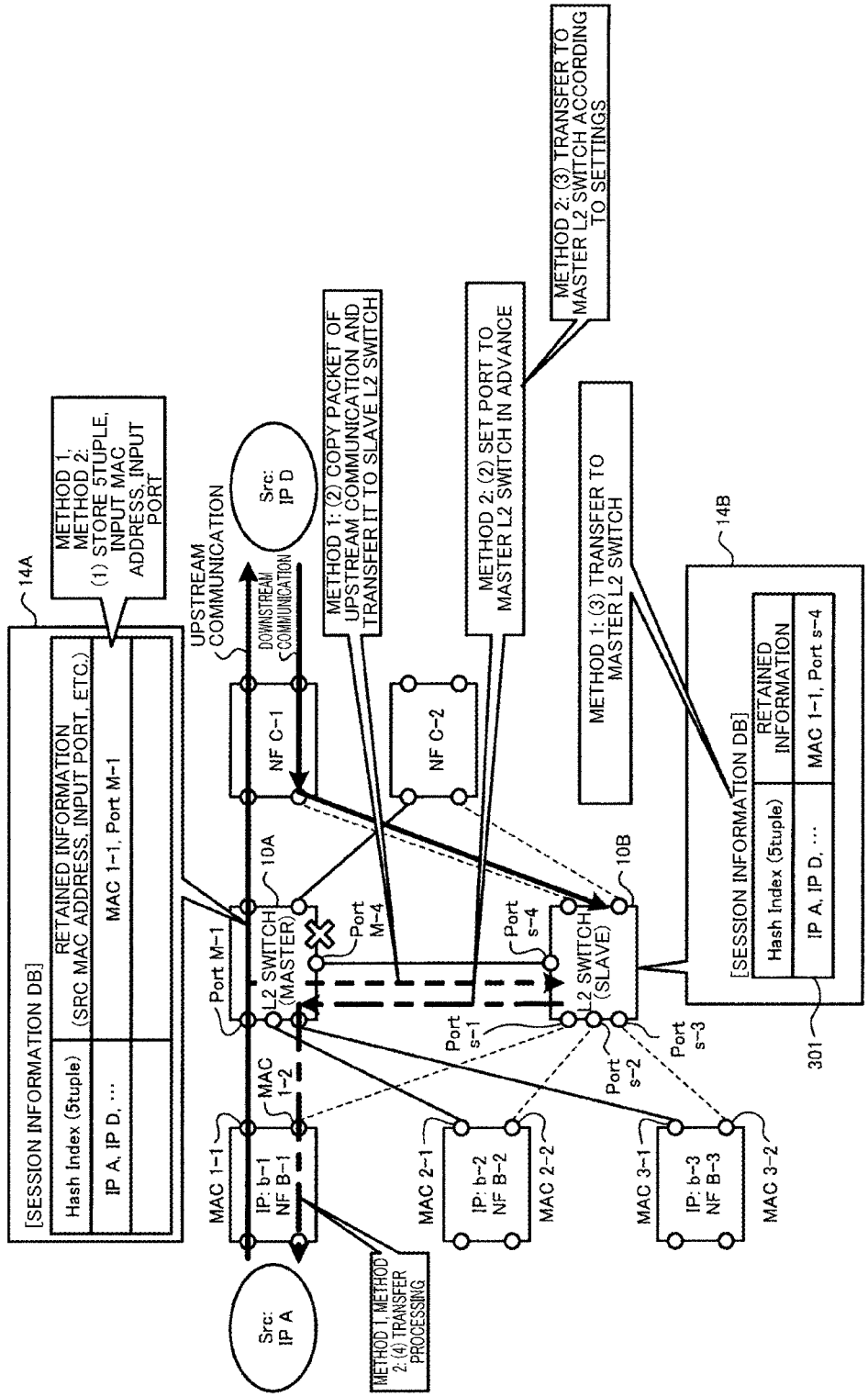
FIG. 8 is a diagram illustrating a schematic operation of the communication system in methods 1 and 2.

Hereinafter, a schematic operation of the communication system in the methods 1 and 2 will be described with reference to FIG. 8. First, a schematic operation of the communication system in the method 1 will be described.

The communication system in the method 1 stores the session information of the upstream communication, in the session information DB 14A, through the same procedure as that of (1) described with reference to FIG. 3. Furthermore, the communication system stores session information indicated by the reference numeral 301 in FIG. 8, in the session information DB 14B of the L2 switch 10B, through the same procedure as that of (2).

Then, upon receiving downstream communication, the L2 switch 10B transfers the downstream communication to the master L2 switch 10A, based on the session information indicated by the reference numeral 301 (the method 1: (3)).

Subsequently, upon receiving the downstream communication from the L2 switch 10B, the L2 switch 10A transfers the downstream communication to the same NF apparatus (the NF B-1) as that of the upstream communication, based on the session information DB 14A (the method 1: (4)).

Next, a schematic operation of the communication system in the method 2 will be described. The communication system in the method 2 also stores the session information of the upstream communication, in the session information DB 14A, through the same procedure as that of (1) described with reference to FIG. 3. Furthermore, the L2 switch 10B sets a port to the L2 switch 10A in advance (the method 2: (2)).

Then, upon receiving a packet of downstream communication, the L2 switch 10B transfers the downstream communication to the master L2 switch 10A, according to the settings in (2) (the method 2: (3)). Subsequently, in a similar way to that of (4) of the method 1, upon receiving the downstream communication from the L2 switch 10B, the L2 switch 10A transfers the downstream communication to the same NF apparatus (the NF B-1) as that of the upstream communication, based on the session information DB 14A (the method 2: (4)).

Processing Procedure

Hereinafter, an example of the processing procedure of the method 1 described above will be described with reference to FIG. 9. Note that S1 to S21 in FIG. 9 are similar to S1 to S21 in FIG. 7, and thus only S32 and its following steps in FIG. 9 will be described.

Figure 9:
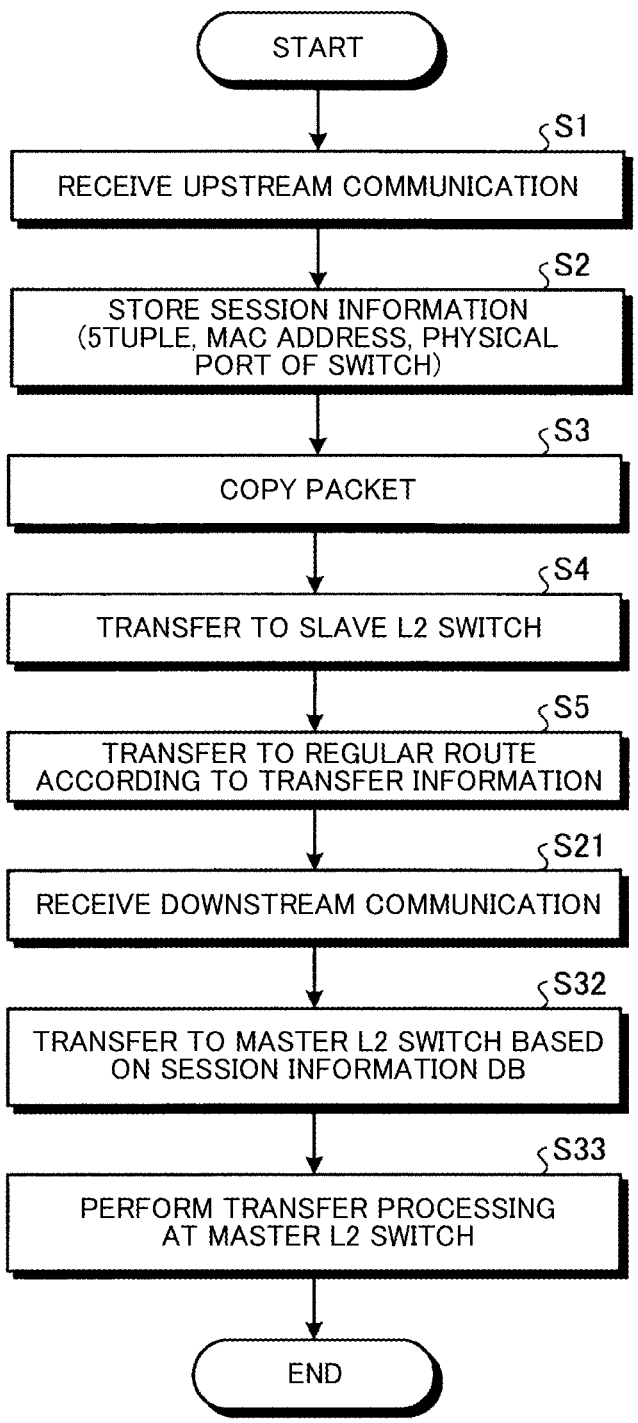
FIG. 9 is a flowchart showing an example of the processing procedure of the communication system in the method 1.

In the method 1, the L2 transferring unit 12B of the L2 switch 10B transfers the downstream communication received in S21 in FIG. 9, to the master L2 switch 10A, based on the session information DB 14B (S32). Then, the L2 transferring unit 12A of the master L2 switch 10A transfers a packet of the downstream communication transferred in S32, based on the session information DB 14A (S33: the master L2 switch performs transfer processing).

Figure 10:
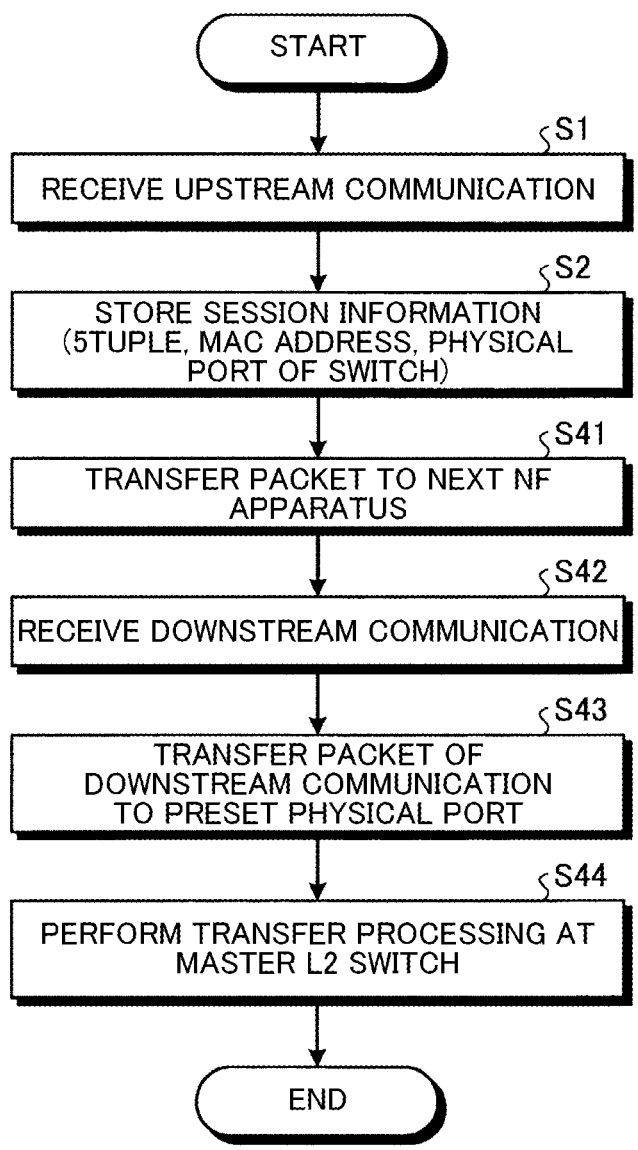
FIG. 10 is a flowchart showing an example of the processing procedure of the communication system in the method 2.

Next, an example of the processing procedure in the method 2 described above will be described with reference to FIG. 10. Note that S1 and S2 in FIG. 10 are similar to S1 and S2 in FIG. 7, and thus only S41 and its following steps in FIG. 10 will be described.

In the method 2, the L2 transferring unit 12A of the L2 switch 11A transfers a packet of the upstream communication received in S1, to a next NF apparatus (S41). Subsequently, upon receiving downstream communication (S42), the L2 transferring unit 12B of the L2 switch 10B transfers the packet of the downstream communication, to a preset physical port (a port connected to the L2 switch 10A) (S43).

Then, the L2 transferring unit 12A of the master L2 switch 10A transfers the transferred packet of the downstream communication, based on the session information DB 14A, in a similar way to that of S33 in FIG. 9 (S44: the master L2 switch performs transfer processing).

In this manner as well, the communication system can transfer the downstream communication to the NF apparatus via which the upstream communication was transmitted. Note that the methods 1 and 2 described above are effective, for example, in the case in which the failure that has occurred in the L2 switch 10A is not a failure of the apparatus itself but a failure of a port (e.g., a failure of a port that connects the L2 switch 10A and an NF apparatus on the path thereafter).

Figure 11:
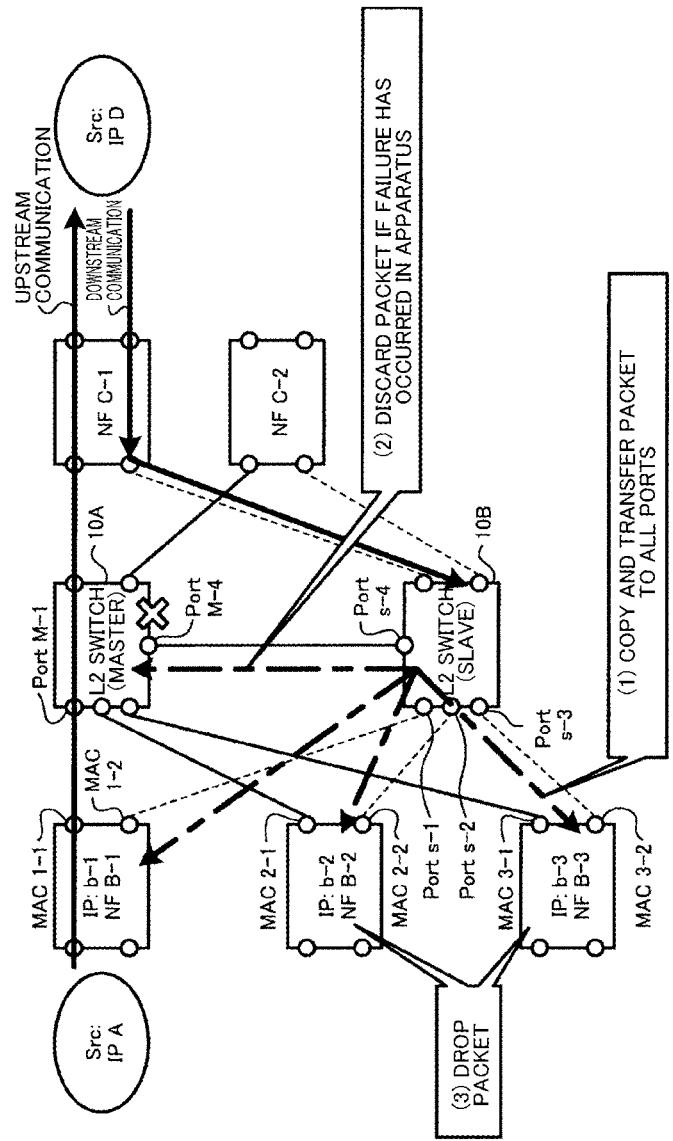
FIG. 11 is a diagram illustrating a schematic operation of the communication system according to another embodiment.
Figure 12:
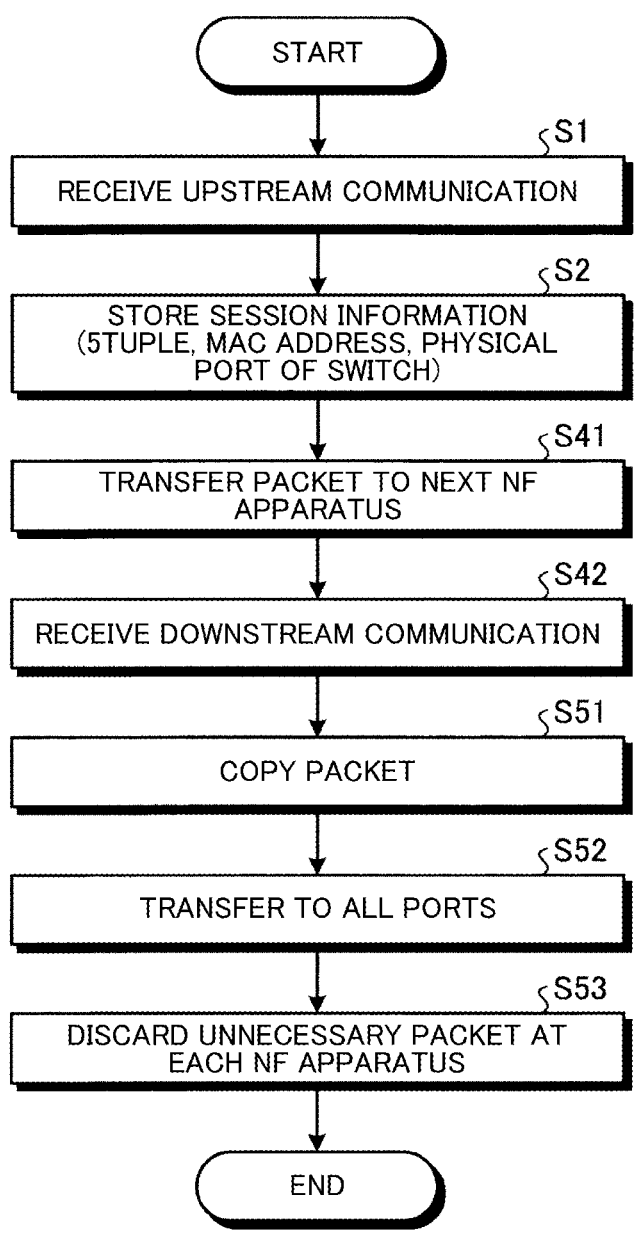
FIG. 12 is a flowchart showing an example of the processing procedure of the communication system according to another embodiment.

Furthermore, it is also possible that the L2 switch 10B of the communication system copies a packet of downstream communication and transfers it to all ports of the L2 switch 10B, for example, as shown in FIG. 11.

For example, upon receiving a packet from a port that receives downstream communication, the L2 switch 10B copies the packet of the downstream communication and transfers it to all ports ((1)). That is to say, the L2 switch 10B transmits the packet of the downstream communication to the L2 switch 10A and the NF B-1 to NF B3 shown in FIG. 11. In this case, if a failure has occurred in an apparatus serving as a transmission destination of the packet, the packet is discarded ((2)). Thus, for example, if a failure has occurred in the L2 switch 10A, the packet of the downstream communication transmitted to the L2 switch 10A is discarded. Furthermore, if an NF apparatus receives a packet that is not to be processed by the NF apparatus itself (an unnecessary packet), the packet is dropped ((3)). Accordingly, the downstream communication reaches the NF apparatus via which the upstream communication was transmitted.

Next, an example of the processing procedure of the communication system will be described with reference to FIG. 11. Note that S1, S2, S41, and S42 in FIG. 11 are similar to S1, S2, S41, and S42 in FIG. 10, and thus only S51 and its following steps in FIG. 11 will be described.

The L2 transferring unit 12B of the L2 switch 10B copies a packet of the downstream communication received in S42 (S51), and transfers it to all ports (S52). Subsequently, each NF apparatus that has received the packet discards an unnecessary packet (S53).

In this manner as well, the communication system can transfer the downstream communication to the NF apparatus via which the upstream communication was transmitted.

Note that, in the foregoing embodiments, the information notifying unit 13A of the L2 switch 10A transmits a copied packet of upstream communication to the L2 switch 10B, but there is no limitation to this. For example, it is also possible that the information notifying unit 13A transmits the session information of the upstream communication stored in the session information DB 14A, to the L2 switch 10B.

Program

Furthermore, a program for realizing functions of the L2 switch 10B described in the foregoing embodiments can be implemented by installing it in a desired information processing apparatus (computer). For example, it is possible to cause an information processing apparatus to function as the L2 switch 10B, by causing the information processing apparatus to execute the above-described program provided as packaged software or online software. The "information processing apparatus" herein includes desktop and laptop personal computers, rack-mount server computers, and the like. In addition, the scope of the information processing apparatus includes mobile communication terminals such as smartphones, mobile phones, and PHS (personal handyphone systems), and further includes PDAs (personal digital assistants). Furthermore, the L2 switch 10B may be implemented on a cloud server.

Figure 13:
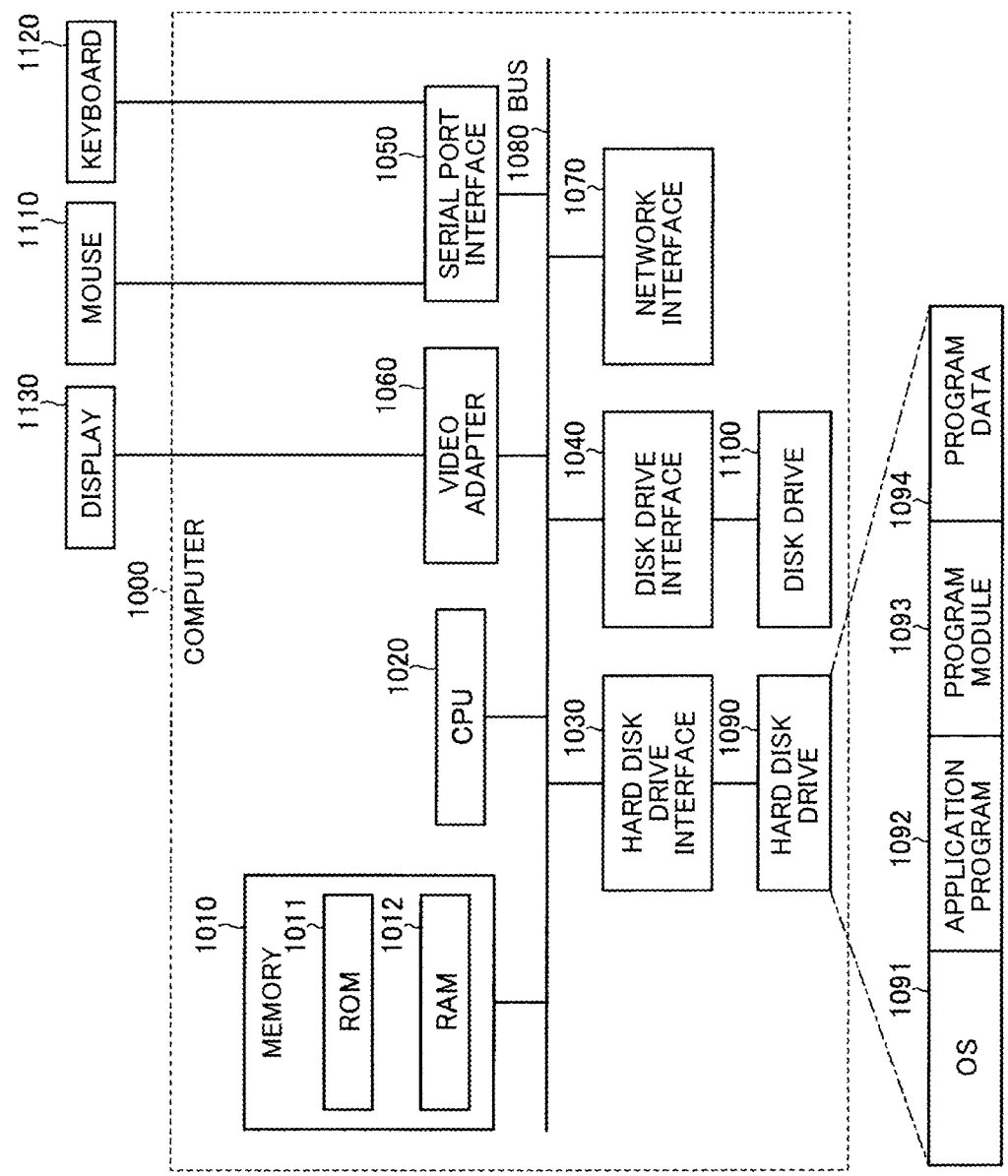
FIG. 13 is a diagram showing an example of a computer that executes a communication control program.

Hereinafter, an example of a computer that executes the above-described program (communication control program) will be described with reference to FIG. 13. As shown in FIG. 13, a computer 1000 includes, for example, a memory 1010, a CPU 1020, a hard disk drive interface 1030, a disk drive interface 1040, a serial port interface 1050, a video adapter 1060, and a network interface 1070. These units are connected via a bus 1080.

The memory 1010 includes a ROM (read only memory) 1011 and a RAM (random access memory) 1012. The ROM 1011 stores, for example, a boot program such as a BIOS (basic input output system). The hard disk drive interface 1030 is connected to a hard disk drive 1090. The disk drive interface 1040 is connected to a disk drive 1100. For example, a removable storage medium such as a magnetic disk or an optical disk is inserted to the disk drive 1100. For example, a mouse 1110 and a keyboard 1120 are connected to the serial port interface 1050. For example, a display 1130 is connected to the video adapter 1060.

As shown in FIG. 13, the hard disk drive 1090 stores, for example, an OS 1091, an application program 1092, a program module 1093, and program data 1094. The session information DB 14B and the MAC learning DB 15B described in the foregoing embodiments are included, for example, in the hard disk drive 1090 or the memory 1010.

Then, the CPU 1020 reads the program module 1093 and the program data 1094 stored in the hard disk drive 1090, as necessary, on the RAM 1012, and executes the above-described procedures.

The program module 1093 and the program data 1094 according to the above-described communication control program do not always have to be stored in the hard disk drive 1090, and, for example, it is also possible that they are stored in a removable storage medium and read by the CPU 1020 via the disk drive 1100 or the like. Alternatively, it is also possible that the program module 1093 and the program data 1094 according to the above-described program are stored in another computer connected via a network such as a LAN or a WAN (wide area network), and read by the CPU 1020 via the network interface 1070.

REFERENCE SIGNS LIST 10, 10A, 10B L2 switch
11A, 11B Session learning unit
12A, 12B L2 transferring unit
13A Information notifying unit
14A, 14B Session information DB
15A, 15B MAC learning DB
16A, 16B Failure determining unit
111B Information update unit

The invention claimed is:

1. A first layer 2 (L2) switch comprising:
 a receiving unit, including one or more computing devices, configured to receive, from a second L2 switch, a copy of upstream communication transmitted from a network apparatus, the second L2 switch configured to relay the upstream communication;

an apparatus specifying unit, including the one or more computing devices, configured to specify (i) a network apparatus serving as a transmission source of the upstream communication, based on apparatus information indicating one or more MAC addresses set for each network apparatus and (ii) a transmission source MAC address included in the received copy of the upstream communication;

a session information processing unit, including the one or more computing devices, configured to:
  refer to the apparatus information and MAC address information indicating, for each port of a plurality of ports of the first L2 switch, a MAC address of an apparatus connected to each port of the first L2 switch, thereby specifying (i) a port among the plurality of ports of the first L2 switch connected to the specified network apparatus serving as the transmission source of the upstream communication and (ii) a MAC address of the transmission source of the upstream communication connected via the specified port, and
  store, in a storage unit, session information of the upstream communication in which information regarding the specified port and the specified MAC address is associated with header information set for the received copy of the upstream communication; and a transferring unit, including the one or more computing devices, configured to, upon receiving downstream communication corresponding to the upstream communication, transfer the downstream communication to the specified network apparatus serving as the transmission source of the upstream communication, using the specified port and the specified MAC address indicated by the session information of the upstream communication stored in the storage unit.

2. The first L2 switch according to claim 1, further comprising:
a failure determining unit, including the one or more computing devices, configured to determine whether or not a failure has occurred in the second L2 switch,
wherein, in a case in which the failure determining unit determines that the failure has occurred in the second L2 switch:
  the apparatus specifying unit is configured to specify a second network apparatus serving as a second transmission source of the upstream communication, and
  the session information processing unit is configured to:
    specify (i) a second port of the first L2 switch connected to the second specified network apparatus serving as the second transmission source of the upstream communication and (ii) a second MAC address of the second transmission source of the upstream communication connected via the second specified port, and
    store, in the storage unit, session information of the upstream communication in which information regarding the second specified port and the second specified MAC address is associated with header information set for the copy of the upstream communication.

3. The first L2 switch according to claim 2, further comprising:
a session information generating unit, including the one or more computing devices, configured to generate session information of the upstream communication in which (i) a port of the first L2 switch used to receive the copy of the upstream communication (ii) the transmission source MAC address included in the copy of the upstream communication are associated with header information set for the copy of the upstream communication received from the second L2 switch,
wherein, in a case in which the failure determining unit determines that the failure has occurred in the second L2 switch, upon receiving the downstream communication corresponding to the upstream communication, the transferring unit is configured to transfer the downstream communication to the second L2 switch, using the port and the transmission source MAC address indicated by the generated session information of the upstream communication.

4. A communication control method that is performed by a first layer 2 (L2) switch, comprising:
receiving, from a second L2 switch, a copy of upstream communication transmitted from a network apparatus, the second L2 switch configured to relay the upstream communication;
specifying (i) a network apparatus serving as a transmission source of the upstream communication, based on apparatus information indicating one or more MAC addresses set for each network apparatus and (ii) a transmission source MAC address included in the received copy of the upstream communication;
referring to the apparatus information and MAC address information indicating, for each port of a plurality of ports of the first L2 switch, a MAC address of an apparatus connected to each port of the first L2 switch, thereby specifying (i) a port among the plurality of ports of the first L2 switch connected to the specified network apparatus serving as the transmission source of the upstream communication and (ii) a MAC address of the transmission source of the upstream communication connected via the specified port;
storing session information of the upstream communication in which information regarding the specified port and the specified MAC address is associated with header information set for the received copy of the upstream communication; and
transferring, upon receiving downstream communication corresponding to the upstream communication, the downstream communication to the specified network apparatus serving as the transmission source of the upstream communication, using the specified port and the specified MAC address indicated by the stored session information of the upstream communication.

5. A non-transitory recording medium storing a communication control program, wherein execution of the communication control program causes one or more computers implemented in a first layer 2 (L2) switch to perform operations comprising:
receiving, from a second L2 switch, a copy of upstream communication transmitted from a network apparatus, the second L2 switch configured to relay the upstream communication;
specifying (i) a network apparatus serving as a transmission source of the upstream communication, based on apparatus information indicating one or more MAC addresses set for each network apparatus and (ii) a transmission source MAC address included in the received copy of the upstream communication;
referring to the apparatus information and MAC address information indicating, for each port of a plurality of ports of the first L2 switch, a MAC address of an apparatus connected to each port of the first L2 switch, thereby specifying (i) a port among the plurality of ports of the first L2 switch connected to the specified network apparatus serving as the transmission source of the upstream communication and (ii) a MAC address of the transmission source of the upstream communication connected via the specified port;

storing session information of the upstream communication in which information regarding the specified port and the specified MAC address is associated with header information set for the received copy of the upstream communication, in a storage unit; and transferring, upon receiving downstream communication corresponding to the upstream communication, the downstream communication to the specified network apparatus serving as the transmission source of the upstream communication, using the specified port and the specified MAC address indicated by the session information of the upstream communication stored in the storage unit.

6. The non-transitory recording medium according to claim 5, wherein the operations further comprise:

determining whether or not a failure has occurred in the second L2 switch, wherein, based on determining that the failure has occurred in the second L2 switch:

specifying a second network apparatus serving as a second transmission source of the upstream communication, and specifying (i) a second port of the first L2 switch connected to the second specified network apparatus serving as the second transmission source of the upstream communication and (ii) a second MAC address of the second transmission source of the upstream communication connected via the second specified port, and storing, in the storage unit, session information of the upstream communication in which information regarding the second specified port and the second specified MAC address is associated with header information set for the copy of the upstream communication, in the storage unit.

7. The non-transitory recording medium according to claim 6, wherein the operations further comprise:

generating session information of the upstream communication in which (i) a port of the first L2 switch used to receive the copy of the upstream communication and (ii) the transmission source MAC address included in the copy of the upstream communication are associated with header information set for the copy of the upstream communication received from the second L2 switch, wherein, based on determining that the failure has occurred in the second L2 switch, upon receiving the downstream communication corresponding to the upstream communication, transferring the downstream communication to the second L2 switch, using the port and the transmission source MAC address indicated by the generated session information of the upstream communication.

* * * * *